(12) United States Patent
Fujiwara

(10) Patent No.: US 8,587,928 B2
(45) Date of Patent: Nov. 19, 2013

(54) ELECTRODE FOR CAPACITOR AND CAPACITOR

(75) Inventor: Hideaki Fujiwara, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 223 days.

(21) Appl. No.: 13/129,983

(22) PCT Filed: Nov. 17, 2009

(86) PCT No.: PCT/JP2009/006151
§ 371 (c)(1),
(2), (4) Date: May 18, 2011

(87) PCT Pub. No.: WO2010/058552
PCT Pub. Date: May 27, 2010

(65) Prior Publication Data
US 2011/0222210 A1 Sep. 15, 2011

(30) Foreign Application Priority Data
Nov. 19, 2008 (JP) .................. 2008-296069

(51) Int. Cl.
*H01G 9/04* (2006.01)
*H01G 9/145* (2006.01)

(52) U.S. Cl.
USPC ......................... 361/528; 361/508

(58) Field of Classification Search
USPC ................. 361/303, 305, 528, 508
See application file for complete search history.

(56) References Cited

U.S. PATENT DOCUMENTS

2006/0079050 A1* 4/2006 Cahalen et al. .............. 438/250
2007/0127189 A1 6/2007 Katraro et al.

FOREIGN PATENT DOCUMENTS

JP 2003-257787 A 9/2003
JP 2007-317784 A 12/2007

OTHER PUBLICATIONS

International Preliminary Report on Patentability for PCT/JP2009/006151, Jun. 3, 2011, pp. 1-5.
International Search Report for PCT/JP2009/006151, Feb. 23, 2010, pp. 1-2.
Translation of International Preliminary Report on Patentability for PCT/JP2009/006151, Jun. 30, 2011, pp. 1-6.

* cited by examiner

*Primary Examiner* — Eric Thomas
(74) *Attorney, Agent, or Firm* — Ditthavong Mori & Steiner, P.C.

(57) ABSTRACT

A capacitor includes a positive electrode base material, a dielectric layer, a positive electrode body, a dielectric layer, a negative electrode body, and a negative electrode base material. The positive electrode body is formed on the positive electrode base material and in part is in contact with the positive electrode base material. The positive electrode body is formed by association of a large number of metal particles, and the associated metal particles form a reticular network. The positive electrode base material and the positive electrode body (core part) are formed of a NiTi alloy containing Ni having a large work function. The dielectric layers (high-permittivity insulating film) are formed of titanium oxide. It is preferable that at least one Ni atomic layer is formed at an interface between the high-permittivity insulating film and the core part. Although the Ni atomic layer is preferably formed over the entire interface, the Ni atomic layer may be partially formed at the interface.

13 Claims, 4 Drawing Sheets

ELECTRODE FOR CAPACITOR AND CAPACITOR

This application is a National Stage Application of PCT/JP2009/006151 filed on Nov. 17, 2009 and claims foreign priority of Japanese Patent Application Number 2008-296069 filed Nov. 19, 2008.

BACKGROUND OF THE INVENTION

1. Field of the Invention

The present invention relates to an electrode for a capacitor suitable for use in a high-capacity capacitor and a capacitor using the electrode for a capacitor.

2. Description of the Related Art

With miniaturization and improvement of the performance of an electronic apparatus typified by a personal computer, a cell phone, and so on, electronic circuits mounted on these electronic apparatuses are required to realize the size reduction, the speed up, and the high integration year after year. This fact is true of passive components forming the electronic circuit. For example, a capacitor is also required to be small in height as possible and have a high capacity.

In general, as a capacitor having a large capacitance per volume, there has been known an electrolytic capacitor in which a porous pellet obtained by pressure forming and firing a powder of a valve action metal having rectification and capable of anodic oxidation, such as aluminum (Al), tantalum (Ta), niobium (Nb), and titanium (Ti) is used as a positive electrode body, and a dielectric layer constituted of these metal oxides is formed on a surface of the positive electrode body (for example, see Patent Document 1). In such a positive electrode body, a powder of a submicron level is utilized as a powder to be used, whereby a positive electrode body having a very large surface area is obtained. Consequently, a high-capacity capacitor can be realized.

PRIOR ART DOCUMENT

[Patent Document]
[Patent Document 1] Japanese Patent Application (Laid-Open) No. 2003-257787

SUMMARY OF THE INVENTION

As in the prior art, when Ti and Ta are used as the valve action metal, a metal oxide film formed on a surface is a high-permittivity insulating film with a high relative permittivity (relative permittivity of tantalum oxide: 20 to 30, relative permittivity of tantalum oxide: 83 to 183). An electron affinity of the high-permittivity insulating film tends to increase as the permittivity increases. Accordingly, in comparison with oxide silicon that is a typical dielectric body, when the high-permittivity insulating film is formed as a dielectric layer, the value of the electron affinity of the high-permittivity insulating film and the value of the work function or the electron affinity of electrodes holding the high-permittivity insulating film therebetween are close to each other, and leak electric current is highly likely to occur, so that the leak current interferes with the increase of the capacity of the capacitor.

In view of the above problems, a general purpose of the present invention is to provide an electrode for a capacitor, which can increase the capacity of the capacitor while suppressing leak current caused by a high-permittivity insulating film constituting a dielectric layer.

An embodiment of the present invention is an electrode for a capacitor. The electrode for a capacitor is characterized by including a core part containing nickel and a high-permittivity insulating film covering the periphery of the core part.

According to the above embodiment, the core part containing nickel having a large work function exists inside the high-permittivity insulating film, whereby even when the high-permittivity insulating film with a large electron affinity is used, a capacitor with high capacity density can be realized while suppressing occurrence of leak current from the core part to the high-permittivity insulating film.

Another embodiment of the present invention is a capacitor. The capacitor is characterized in that the electrode for a capacitor in the above embodiment is used on the positive electrode side and characterized by including a core part and a negative electrode body formed on the opposite side of the core part so that a high-permittivity insulating film is provided between the core part and the negative electrode body.

According to the above embodiment, it is possible to suppress the occurrence of the leak current due to the high-permittivity insulating film with a large electron affinity.

Still another embodiment of the present invention is a capacitor. The capacitor is characterized in that the electrode for a capacitor in the above embodiment is used on the negative electrode side and characterized by including a core part and a positive electrode body formed on the opposite side of the core part while a high-permittivity insulating film is provided between the core part and the positive electrode body.

According to the above embodiment, when an effective work function of a negative electrode body is large, it is possible to suppress the occurrence of the leak current due to the high-permittivity insulating film with a large electron affinity.

According to the present invention, the capacity of the capacitor can be increased while suppressing the leak current.

DETAILED DESCRIPTION OF THE EMBODIMENTS

Figure 1:
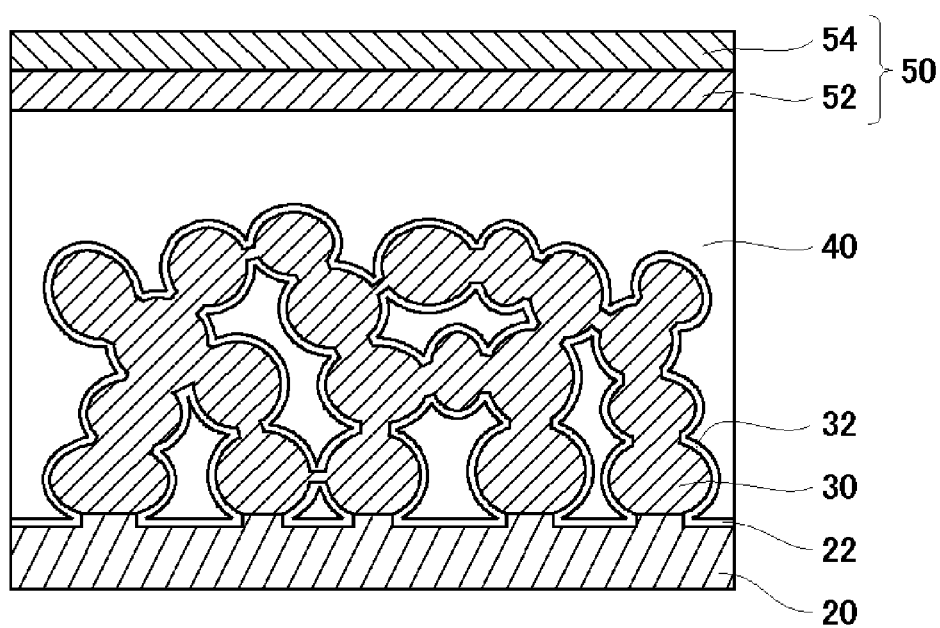
FIG. 1 is a cross-sectional view showing a structure of a capacitor including an electrode for a capacitor according to a first embodiment.

Hereinafter, embodiments according to the present invention will be described referring to the drawings. In all the drawings, similar components are denoted by similar reference numerals, and description thereof will not be repeated suitably.

(First Embodiment)

FIG. 1 is a cross-sectional view showing a structure of a capacitor including an electrode for a capacitor according to a first embodiment. A capacitor 10 includes a positive electrode base material 20, a dielectric layer 22, a positive electrode body 30, a dielectric layer 32, a negative electrode body 40, and a negative electrode base material 50.

The positive electrode base material 20 and the positive electrode body 30 constitute a positive electrode of the capacitor 10. The positive electrode base material 20 is connected to an external lead-out anode terminal (not shown). Although the form of the positive electrode base material 20 is not limited especially, a thin film (foil), a lead wire, or the like is used as the positive electrode base material 20. When the positive electrode base material 20 is a thin film, the thickness of the positive electrode base material 20 is about 50 to 100 μm, for example.

The positive electrode body 30 is formed on the positive electrode base material 20 and in part is in contact with the positive electrode base material 20. The positive electrode body 30 is formed by association of a large number of metal particles, and the associated metal particles form a reticular network.

The positive electrode base material 20 and the positive electrode body 30 correspond to a "core part" of the electrode for a capacitor according to the first embodiment. In the present embodiment, the positive electrode base material 20 and the positive electrode body 30 are formed of a NiTi alloy containing Ni having a large work function (approximately 5.2 eV). A metal such as Ru, Pt, Ir may be used as a material having a large work function alternative to Ni.

The positive electrode base material 20 and the positive electrode body 30 respectively have on their surfaces dielectric layers 22 and 32. The film thickness of the dielectric layers 22 and 32 is 10 nm. In the present embodiment, the dielectric layers 22 and 32 are formed of titanium oxide. The relative permittivity of titanium oxide is approximately 100, and titanium oxide is a high-permittivity oxide. Namely, the dielectric layers 22 and 32 correspond to a "high-permittivity insulating film" of the electrode for a capacitor according to the first embodiment. As the high-permittivity oxide constituting the dielectric layers 22 and 32, a metal oxide such as Hf, Zr, Ta, and Nb may be used. A composite material composed of the positive electrode body 30 and the dielectric layer 32 is porous, and the specific surface area is extremely large.

It is preferable that at least one Ni atomic layer is formed at an interface between the high-permittivity insulating film and the core part. Although the Ni atomic layer is preferably formed over the entire interface, the Ni atomic layer may be partially formed at the interface. Further, a layer of a NiTi alloy more Ni-rich than the core part may be formed at the interface between the high-permittivity insulating film and the core part.

The negative electrode body 40 and the negative electrode base material 50 constitute a negative electrode of the capacitor 10. The negative electrode body 40 functions as an electrolyte layer, and an electroconductive polymer such as polythiophene, polypyrrole, and polyaniline and an electroconductive polymer such as TCNQ (7, 7, 8, 8-tetracyanoquinodimethane) complex salt are used as the negative electrode body 40. The negative electrode body 40 is provided so as to fill in a space between the positive electrode base material 20 and the negative electrode base material 50 and is filled in a gap portion formed by a composite material composed of the positive electrode body 30 and the dielectric layer 32.

The negative electrode base material 50 is constituted of a carbon paste layer 52 stacked on the negative electrode body 40 and a silver paste layer 54 stacked on the carbon paste layer 52, for example. The negative electrode base material 50 is connected to an external lead-out cathode terminal (not shown).

(Method of Manufacturing Electrode for Capacitor)

A method of manufacturing the electrode for a capacitor used in the first embodiment will be described. First, a TiNi alloy having a particle size of 10 nm to 1 μm is deposited on a NiTi thin film (corresponding to the positive electrode base material 20) using a cold spray method. Consequently, the TiNi alloys are joined to each other to form a porous and high surface area network structure, and, thus, to form a NiTi alloy layer (corresponding to the positive electrode body 30) having a large porosity. The cold spray method is a processing method of spraying a material particle or a material powder made into a predetermined high-temperature and high-speed flow onto a surface of a subject to be covered, depositing the material particles on the surface of the subject, and coating the subject. In the cold spray method, since a high surface area porous layer can be formed in comparison with a sintering method, the capacity density of the capacitor can be increased.

Next, high-temperature oxidation treatment is performed in low oxygen partial pressure environments (for example, under an atmosphere of $O_2$: 20% and $N_2$: 80%) to thereby oxidize a surface of a NiTi alloy layer and a NiTi thin film. At that time, since Ti is predominantly easier oxidized than Ni, a covering layer formed of titanium oxide, that is, a high-permittivity insulating film is formed on the surfaces of the NiTi alloy layer and the NiTi thin film. Ni forming an alloy is driven into the high-permittivity insulating film formed of titanium oxide, and the surfaces of the NiTi alloy layer and the NiTi thin film become Ni rich, and the nickel concentration at the interface between the high-permittivity insulating film and the core part (the NiTi alloy layer and the NiTi thin film) increases. It is desirable that at least one Ni atomic layer is formed. Although the Ni atomic layer may be formed over the entire interface between the high-permittivity insulating film and the core part, the Ni atomic layer may be formed at a part of the interface between the high-permittivity insulating film and the core part.

According to the above processes, the electrode for a capacitor used in the first embodiment is manufactured.

(Confirmation of Ni Rich Layer)

Figure 2:
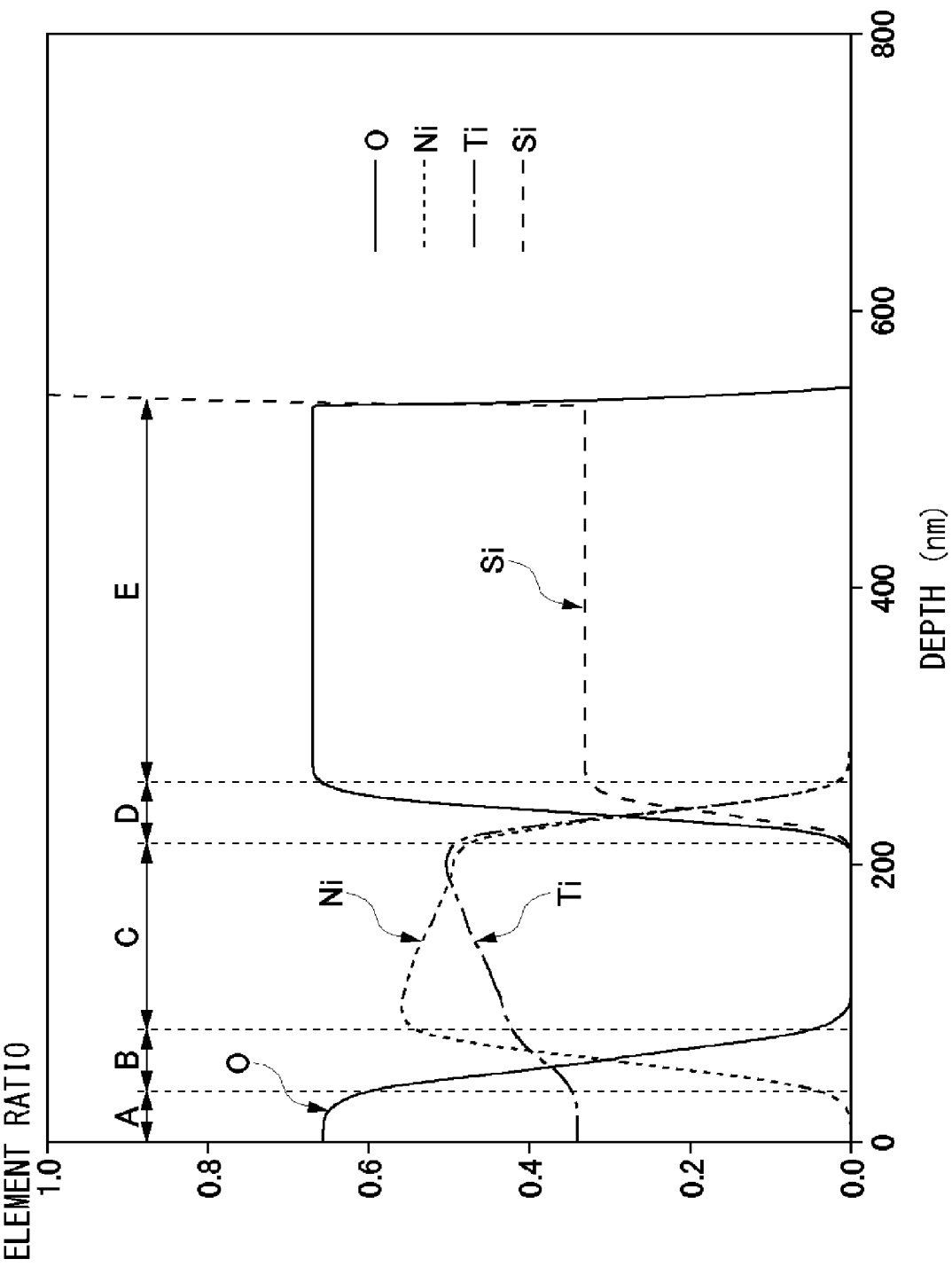
FIG. 2 is a Rutherford backscattering spectrum of a sample in which a surface of a NiTi (alloy) layer provided on a silicon dioxide substrate is oxidized.

FIG. 2 is a Rutherford backscattering spectrum of a sample in which a surface of a NiTi (alloy) layer provided on a silicon dioxide substrate is oxidized. The NiTi layer corresponds to the NiTi alloy layer or the NiTi thin film of the first embodiment. The Rutherford backscattering spectrum is measured using an RBS (Rutherford Backscattering Spectrometry) measuring device. The main measurement conditions are shown below:

energy resolution capability: 20 keV, incident ion: $^4He^{++}$, incident energy: 2.3 MeV, incident angle: 0 deg, sample current: 20 nA, incident beam diameter: 2 mm, sample rotation: 0 deg, irradiance level: 240 μC, chamber vacuum degree: $5.1 \times 10^{-5}$ Pa, scattering angle of detector: 160 deg, and aperture diameter of detector: 8 mm.

Components in regions A to E in FIG. 2 are shown below:

region A: titanium oxide layer, region B: intermediate layer changing from titanium oxide layer to NiTi layer, region C: NiTi layer, region D: intermediate layer changing from NiTi layer to silicon dioxide layer, and region E: silicon dioxide layer (silicon dioxide substrate)

The NiTi layer on the silicon dioxide substrate has the same component in a depth direction before being oxidized. Meanwhile, after the oxidization of the NiTi layer, as shown in FIG. 2, the titanium oxide layer (region A) is formed on a surface of the NiTi layer (region C) through the intermediate layer (region B), and Ni in the titanium oxide layer (region A) and the intermediate layer (region B) is moved toward the silicon dioxide substrate to be concentrated in the NiTi layer (region C). Therefore, the Ni concentration on the outermost surface of the NiTi layer (region C) is higher than the Ni concentration of the deepest portion of the NiTi layer (region C). The NiTi layer is oxidized thus, whereby it is confirmed that a Ni-rich region is formed on the surface of the NiTi layer (on the titanium oxide layer side).

In the above capacitor including the electrode for a capacitor according to the first embodiment, the Ni layer having a large work function or the Ni-rich NiTi alloy exits at the interface between the core part and the high-permittivity insulating film, which will become the positive electrode. According to this constitution, even when a high-permittivity insulating film with a large electron affinity is used, a capacitor with high capacity density can be realized while suppressing the occurrence of the leak current.

Since the material used in the core part is a more inexpensive NiTi alloy alternative to Ta used in the conventional solid electrolytic capacitor, a high-capacity capacitor can be manufactured at lower cost.

The film thickness of the high-permittivity insulating film obtained by oxidizing a surface is changed without changing the composition of the NiTi alloy which will become the core part, whereby the capacitor can easily respond to various withstand pressures required for the capacitor while suppressing the leak current.

In the electrode for a capacitor according to the above embodiment, an energy difference between a Fermi level of a Ni or Ni-rich NiTi alloy and a conduction band of the high-permittivity insulating film is not less than about 1 eV at the interface between the core part and the high-permittivity insulating film. Therefore, when an effective work function of the negative electrode body 40 (electroconductive polymer) is large, the side of the electrode for a capacitor constituted of the core part and the high-permittivity insulating film is used as a negative electrode, and the negative electrode body 40 is used as the "positive electrode body", whereby the leak current can be suppressed.

(Second Embodiment)

Figure 3:
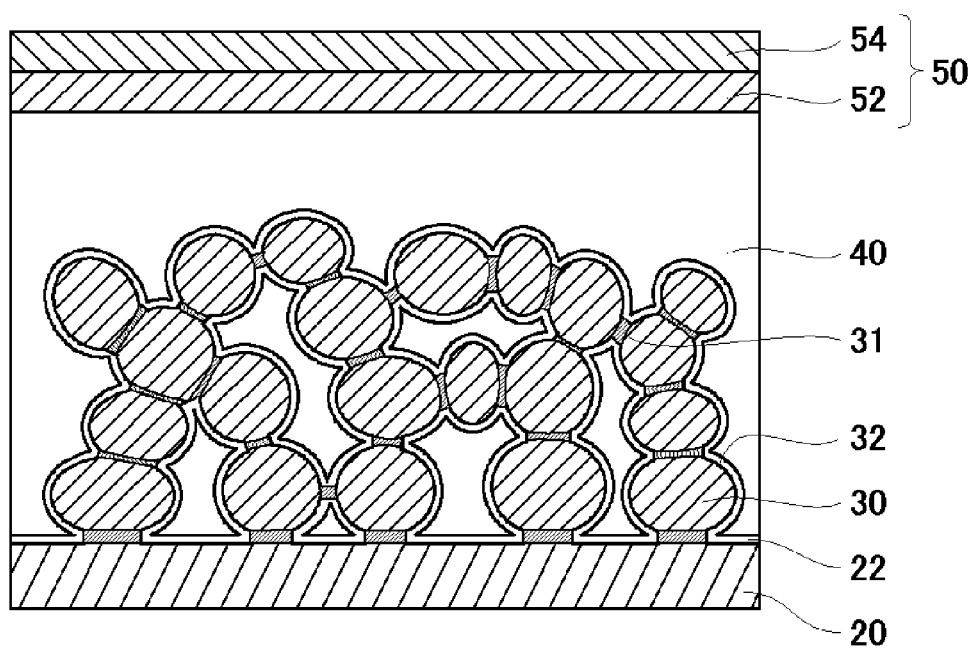
FIG. 3 is a cross-sectional view showing a structure of a capacitor including an electrode for a capacitor according to a second embodiment.

FIG. 3 is a cross-sectional view showing a structure of a capacitor including an electrode for a capacitor according to a second embodiment. In the electrode for a capacitor according to the second embodiment, Ni is used as a material of a core part, that is, a positive electrode base material 20 and a positive electrode body 30. More specifically, the positive electrode body 30 is formed by connection of a large number of Ni particles. A metal such as Ru, Pt, Ir may be used as a material having a large work function alternative to Ni.

A Ta layer 31 containing Ta is interposed at the connected portion of the Ni particles, and the Ta layer 31 is a part of the positive electrode body 30. Likewise, the Ta layer 31 is interposed at the connection portion between the positive electrode base material 20 and the positive electrode body 30. More specifically, the Ta layer 31 is formed of a Ta layer, a NiTa alloy layer, or a mixed layer composed of a Ta layer and a NiTa alloy layer.

In the present embodiment, the high-permittivity insulating film, that is, dielectric layers 22 and 32 are formed of tantalum oxide. The relative permittivity of tantalum oxide is approximately 28, and tantalum oxide is a high-permittivity oxide. As a high-permittivity oxide constituting the dielectric layers 22 and 32, a metal oxide such as Hf, Zr, Ti, and Nb may be used.

(Method of Manufacturing Electrode for Capacitor)

A method of manufacturing the electrode for a capacitor used in the second embodiment will be described. First, a Ta layer is film-formed on a Ni thin film (corresponding to the positive electrode base material 20) using a CVD method, for example. Subsequently, Ni particles covered by a Ta coat having a particle size of 10 nm to 1 µm (thickness: 10 nm, for example) are deposited on a Ta layer, using a cold spray method. Consequently, Ni particles are connected to each other through the Ta coat to form a porous and high surface area network structure, and, thus, to form a Ni alloy layer (corresponding to the positive electrode body 30) having a large porosity. At that time, relative to before deposition, the Ta coat interposed between the Ni particles is thinned by the pressure generated when the Ni particles collide with each other. Likewise, the Ni particles and the Ni thin film are connected through the Ta coat and the Ta layer.

Next, by virtue of the application of anodization treatment, an exposed portion of the Ta coat and the Ta layer is oxidized, and a covering layer formed of tantalum oxide, that is, the high-permittivity insulating film is formed; provided that, the Ta coat interposed between the Ni particles and the Ta layer (hereinafter collectively referred to as a remaining Ta layer) interposed between the Ni particle and the Ni thin film remain as metal without being oxidized. Further, Ni is diffused from the Ni particle or the Ni thin film to the remaining Ta layer by thermal oxidation. Therefore, the remaining Ta layer contains Ni. Namely, the remaining Ta layer (the Ta layer 31 of FIG. 3) is formed of a Ta layer, a NiTa alloy layer, or a mixed layer composed of a Ta layer and a NiTa alloy layer.

According to the above processes, the electrode for a capacitor used in the second embodiment is manufactured.

In the above capacitor including the electrode for a capacitor according to the second embodiment, the core part formed of Ni having a large work function exists inside the high-permittivity insulating film. According to this constitution, even when a high-permittivity insulating film with a large electron affinity is used, a capacitor with high capacity density can be realized while suppressing the occurrence of the leak current from the core part to the high-permittivity insulating film.

The material used in the core part is more inexpensive Ni alternative to Ta used in the conventional solid electrolytic capacitor, and only the Ta coat uses Ta. According to this constitution, since the amount of Ta to be used is reduced in comparison with the prior art, a high-capacity capacitor can be manufactured at lower cost.

The Ta coat can be oxidized by anodic oxidation used in manufacturing the conventional solid electrolytic capacitor. Therefore, no special manufacturing is required, and the manufacturing cost of the capacitor can be reduced.

In the electrode for a capacitor according to the above embodiment, an energy difference between a Fermi level of Ni and a conduction band of the high-permittivity insulating film is not less than about 1 eV at the interface between the core part and the high-permittivity insulating film. Therefore, when an effective work function of the negative electrode body 40 (electroconductive polymer) is not large, the side of the electrode for a capacitor constituted of the core part and the high-permittivity insulating film is used as a negative electrode, whereby the leak current can be suppressed.

(Third Embodiment)

Figure 4:
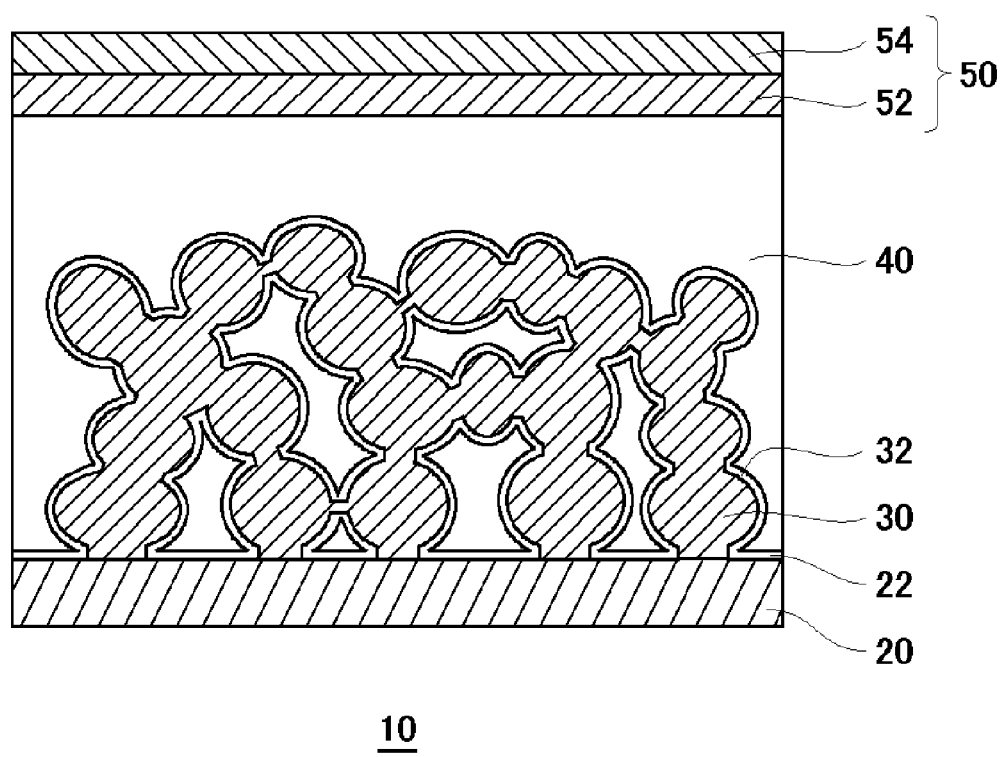
FIG. 4 is a cross-sectional view showing a structure of a capacitor including an electrode for a capacitor according to a third embodiment.

FIG. 4 is a cross-sectional view showing a structure of a capacitor including an electrode for a capacitor according to a third embodiment. In the electrode for a capacitor according to the third embodiment, Ni is used as a material of a core part, that is, a positive electrode base material 20 and a positive electrode body 30. More specifically, the positive electrode body 30 is formed by connection of a large number of Ni particles. A metal such as Ru, Pt, Ir may be used as a material having a large work function alternative to Ni.

Meanwhile, in the present embodiment, a high-permittivity insulating film, that is, dielectric layers 22 and 32 are formed of titanium oxide. As the high-permittivity oxide constituting the dielectric layers 22 and 32, a metal oxide such as Hf, Zr, Ta, and Nb may be used.

When taken together, the core part formed of Ni is formed inside the high-permittivity insulating film formed of titanium oxide. The outermost layer of the core part is oxidized and may become a nickel oxide layer; however, also in this case, the effective work function of a Ni electrode is large, and the leak current can be suppressed effectively.

(Method of Manufacturing Electrode for Capacitor)

A method of manufacturing the electrode for a capacitor used in the third embodiment will be described. First, Ni particles having a particle size of 10 nm to 1 μm are deposited on a Ni thin film (corresponding to the positive electrode base material 20) using a cold spray method. Consequently, Ni particles are connected to each other to form a porous and high surface area network structure, and, thus, to form a Ni layer (corresponding to the positive electrode body 30) having a large porosity. Next, a Ti coat formed of Ti is formed on surfaces of a Ni layer and a Ni thin film, using a plating method and an ion plating method, for example. The film thickness of the Ti coat is 10 nm, for example.

Next, high-temperature oxidation treatment is performed in low oxygen partial pressure environments (for example, under an atmosphere of $O_2$: 20% and $N_2$: 80%) to thereby rapidly oxidize the Ta coat. Consequently, the Ni layer and the Ni thin film are covered by the high-permittivity insulating film formed of titanium oxide. According to the oxidation condition, the outermost layer of the core par is oxidized and may become a nickel oxide layer; however, also in this case, the effective work function of the Ni electrode is large, and the leak current can be suppressed effectively.

According to the above processes, the electrode for a capacitor used in the third embodiment is manufactured.

In the above capacitor including the electrode for a capacitor according to the third embodiment, the core part formed of Ni having a large work function exists inside the high-permittivity insulating film. According to this constitution, even when a high-permittivity insulating film with a large electron affinity is used, a capacitor with high capacity density can be realized while suppressing the occurrence of the leak current from the core part to the high-permittivity insulating film.

Since the material used in the core part is more inexpensive Ni alternative to Ta used in the conventional solid electrolytic capacitor, a high-capacity capacitor can be manufactured at lower cost.

Further, the thickness of the Ti coat formed on the surface of Ni which will become the core part is changed, whereby the film thickness of the high-permittivity insulating film obtained by oxidation can be changed. The film thickness of the high-permittivity insulating film is changed thus, whereby the capacitor can easily respond to various withstand pressures required for the capacitor.

In the electrode for a capacitor according to the above embodiment, an energy difference between a Fermi level of Ni and a conduction band of the high-permittivity insulating film is not less than about 1 eV at the interface between the core part and the high-permittivity insulating film. Therefore, when an effective work function of the negative electrode body 40 (electroconductive polymer) is not large, the side of the electrode for a capacitor constituted of the core part and the high-permittivity insulating film is used as a negative electrode, and the negative electrode body 40 is used as a "positive electrode body", whereby the leak current can be suppressed.

In the above first to third embodiments, although the cold spray method is used in the deposition of the Ni-containing particles, as the process of depositing the Ni-containing particles, other methods including a sintering method, an aerosol deposition method, a powder jet method, and a CVD method may be used.

DESCRIPTION OF REFERENCE NUMERALS

10 Capacitor
20 Positive electrode base material
22 Dielectric layer
30 Positive electrode body
32 Dielectric layer
40 Negative electrode body
50 Negative electrode base material The present invention has an industrial applicability in the fields of an electrode for a capacitor suitable for use in a high-capacity capacitor and a capacitor using the electrode for a capacitor.

What is claimed is:

1. An electrode for a capacitor comprising:
a core part containing nickel; and
a dielectric film covering the periphery of the core part,
wherein the core part and the dielectric film form a porous layer, and a nickel layer or a nickel alloy layer with a nickel density higher than the core part is formed at a part of or whole interface between the core part and the dielectric film.

2. The electrode for a capacitor according to claim 1, wherein
the dielectric film is a titanium oxide film or a tantalum oxide film.

3. The electrode for a capacitor according to claim 2, wherein
the dielectric film is the titanium oxide film,
the core part is alloy of nickel and titanium, and
—the nickel alloy layer is a nickel-titanium alloy layer.

4. A capacitor, which uses the electrode for a capacitor according to claim 3 on the positive electrode side, comprising the core part and a positive electrode body formed on the opposite side of the core part so that the dielectric film is provided between the core part and the positive electrode body.

5. The capacitor according to claim 4, wherein the negative electrode body includes an electroconductive polymer.

6. A capacitor, which uses the electrode for a capacitor according to claim 2 on the positive electrode side, comprising the core part and a negative electrode body formed on the opposite side of the core part so that the dielectric film is provided between the core part and the negative electrode body.

7. The capacitor according to claim 6, wherein the negative electrode body includes an electroconductive polymer.

8. A capacitor, which uses the electrode for a capacitor according to claim 1 on the positive electrode side, comprising the core part and a negative electrode body formed on the opposite side of the core part so that the dielectric film is provided between the core part and the negative electrode body.

9. The capacitor according to claim 8, wherein the negative electrode body includes an electroconductive polymer.

10. A capacitor, which uses the electrode for a capacitor according to claim 9 on the positive electrode side, comprising the core part and a negative electrode body formed on the opposite side of the core part so that the dielectric film is provided between the core part and the negative electrode body.

11. The capacitor according to claim 10, wherein the negative electrode body includes an electroconductive polymer.

12. A capacitor, which uses the electrode for a capacitor according to claim 1 on the negative electrode side, comprising the core part and a positive electrode body formed on the opposite side of the core part so that the dielectric film is provided between the core part and the positive electrode body.

13. An electrode for a capacitor comprising:
   a core part containing nickel and titanium; and
   a dielectric film containing titanium oxide covering the periphery of the core part, wherein
   a nickel layer or a nickel alloy layer with a nickel density higher than the core part is formed at a part of or whole interface between the core part and the dielectric film.

* * * * *